United States Patent [19]

August

[11] Patent Number: 4,671,632

[45] Date of Patent: Jun. 9, 1987

[54] THREE-DIMENSIONAL DISPLAY APPARATUS

[76] Inventor: Jerome M. August, 3 S. 260 Park Blvd., Glen Ellyn, Ill. 60137

[21] Appl. No.: 779,954

[22] Filed: Sep. 25, 1985

Related U.S. Application Data

[62] Division of Ser. No. 614,084, May 24, 1984, Pat. No. 4,575,207.

[51] Int. Cl.⁴ .......................... G03B 35/20; H04N 9/54
[52] U.S. Cl. ......................................... 352/58; 352/81; 353/7; 354/112; 358/88; 313/478
[58] Field of Search ............. 354/75, 76, 77, 112–117; 313/478; 358/88; 352/58, 81; 353/7

[56] References Cited

U.S. PATENT DOCUMENTS

| | | | |
|---|---|---|---|
| 2,307,276 | 1/1943 | Keyzer | 352/58 |
| 2,740,954 | 4/1956 | Kleefeld | 313/478 |
| 2,883,906 | 4/1959 | Rehorn | 358/88 |
| 3,293,358 | 12/1966 | Ratliff | 358/88 |
| 3,449,049 | 6/1969 | Harding et al. | 355/53 |
| 3,494,270 | 2/1970 | Shibata | 354/112 |
| 3,535,993 | 10/1970 | Jones | 354/115 |
| 3,852,787 | 12/1974 | Nims et al. | 354/275 |
| 3,882,513 | 5/1975 | Bonnet | 354/115 |
| 3,895,867 | 7/1975 | Lo et al. | 355/77 |
| 4,056,316 | 11/1977 | Zutrauen | 355/22 |
| 4,092,654 | 5/1978 | Alasia | 354/112 |
| 4,101,210 | 7/1978 | Lo et al. | 353/7 |
| 4,107,712 | 8/1978 | Law | 354/115 |
| 4,305,095 | 12/1981 | Dallas | 358/88 |
| 4,584,604 | 4/1986 | Guichard et al. | 358/88 |

FOREIGN PATENT DOCUMENTS 56-168326 12/1981 Japan ..................... 313/478

Primary Examiner—A. A. Mathews
Attorney, Agent, or Firm—Fitch, Even, Tabin & Flannery

[57] ABSTRACT

Three-dimensional display apparatus including the combination of a cathode ray tube having a viewing face, and a line screen assembly positioned in a predetermined relationship with the viewing face. The line screen assembly includes a first line screen disposed towards the viewing face and has a number of blocking portions spaced by transparent portions. The line screen assembly also includes a second line screen positioned substantially parallel to and spaced from first line screen. The second line screen also has a number of blocking portions spaced by transparent portions. The blocking portions of the second line screen are in alignment with the transparent portions of the first line screen. Three-dimensional projection display apparatus is also disclosed.

6 Claims, 20 Drawing Figures

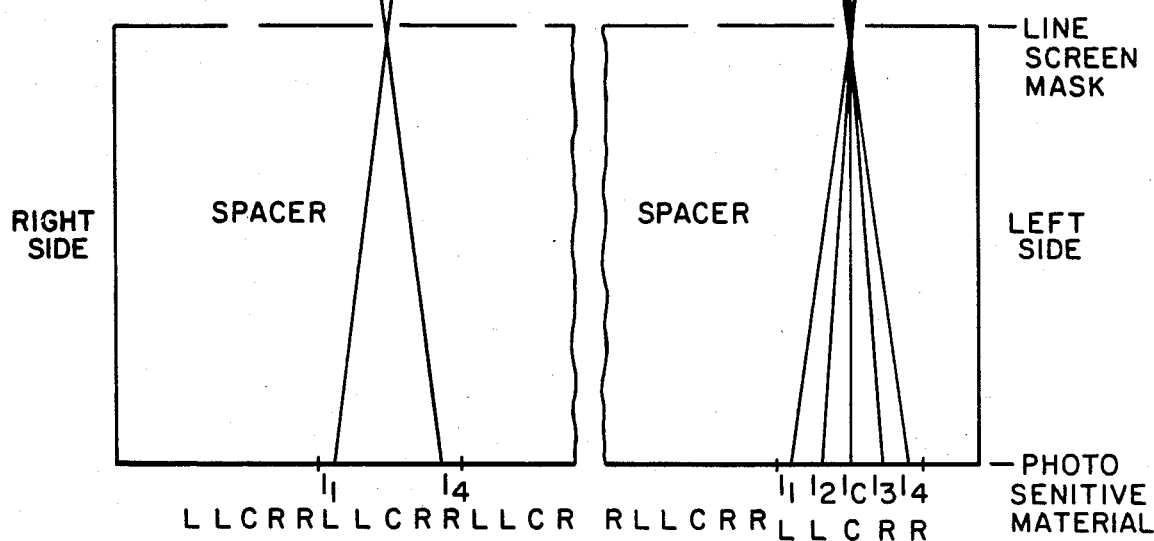
FIG. 5b  FIG. 5a
   
FIG. 6

THREE-DIMENSIONAL DISPLAY APPARATUS

This is a division of application Ser. No. 614,084 filed May 24, 1984, now U.S. Pat. No. 4,575,207.

BACKGROUND OF THE INVENTION

The subject invention relates to photography and, more particularly, to a three-dimensional effect representation and camera.

An observer is able to judge limited distances because of the slightly different aspect or view that each human eye receives of the scene, parallax. The views received by the eyes are combined by the brain to provide a three-dimensional view, where depth is perceived. In ordinary representations (transparencies, photographs, film . . . ) where the scene is recorded from a single direction, this depth is lost, the scene appears flat, two dimensional.

Over the years there have been numerous attempts to devise a three-dimensional effect using a two-dimensional photograph or transparency by dividing each representation into narrow vertical strips and interlacing them in one picture. A vertical grid in front of the picture is in precise registration with vertical strips to allow each eye to see the different strips to give a stereoscopic image. Such attempts have met with varying degrees of technical and commercial success. The mind of the observer wants to see in three dimensions and if given the opportunity, the mind will interpret visual information so as to cause the three-dimensional effect. The two-dimensional representations for providing the three-dimensional effect include numerous optical pairings, that is, visual pairings that can be seen concurrently by the observer's eyes. If one of these pairings is a stereoscopic pairing (a pairing that shows slightly different aspects of the same object) the mind will accept the stereoscopic pairing and ignore the non-stereoscopic optical pairings to obtain the three-dimensional effect. However, if a stereoscopic pairing is unavailable to the eyes when the two-dimensional representation is viewed from a particular angle, the representation will appear garbled and only two-dimensional.

In one early attempt to obtain a three-dimensional effect representation using a single lens incorporating a horizontal slit aperture, a line screen was located between the camera lens and the photosensitive film. The representation formed proved to be abnormal in that as the observer moved slightly laterally, the object photographed appeared to be moving longitudinally, that is, toward and away from the observer. For further information regarding this type of representation and the apparatus used in recording it, reference may be made to U.S. Pat. No. 1,882,424.

Photographic representations made and viewed under lenticular screens have been proposed and commercialized. The use of the lenticular screen is advantageous because it functions to divide the object field into lineform images and lenticules over the representation provided stereoscopic pairings. One of the many problems associated with the use of lenticular screens when used directly is that the object appears reversed and additional lenticular lenses or prisms are required to reverse the line form images to obtain normalcy. Another problem is that the use of the lenticular screen makes it difficult to fill the entire area of the photosensitive material under the screen. Under normal circumstances, the area under each lenticule will include comparatively large portions which are not exposed. At certain viewing distances or angles, the observer would see two unexposed areas through lenticules of the viewing screen, thus ruining the three-dimensional effect. For further information regarding optical components for image reversal and a method and apparatus for completely filling the photosensitive material under the lenticules, reference may be made to U.S. Pat. Nos. 3,535,993 and 3,895,867, respectively.

SUMMARY OF THE INVENTION

Among the several objects of the present invention may be noted the provision of an improved three-dimensional effect transparency assembly and camera for use in making the transparency. The camera is simple to use and allows the several exposures required for reproduction fo the photographed object to be made by the user without access to the inside of the camera. The transparency assembly of the present invention avoids the use of a lenticular screen during either exposure of the photosensitive material or viewing of the transparency resulting from development of the photosensitive material. The transparency assembly permits true three-dimensional effect viewing, without any aids such as colored glasses, over a wide viewing angle and over a great angle of distances without any garbling of the object or the presence of blind spots, thus permitting concurrent viewing by a large number of observers and continued viewing by an observer as that observer moves about a great area. Another object of the transparency assembly and camera is ease of use, long service life and that both are simple and economical to manufacture. Other objects and features will be, in part, apparent and, in part, pointed out hereinafter in the following specification and attendant claims and drawings.

Briefly, the apparatus of the present invention includes a camera, movable support means for supporting the object whose image is to be taken and a photosensitive assembly. The camera comprises mounting means for retaining the photosensitive assembly at a predetermined location. The assembly comprises a layer of photosensitive material, a line screen having regularly spaced blocking portions spaced by transparent portions, and a transparent spacer positioned between the photosensitive material and the line screen. The camera has a central axis with which the photosensitive assembly is aligned. The lens and the support means are movable along respective paths which paths extend transversely of the central axis. A three-dimensional effect transparency can be produced by placing the object at a number of spaced object positions, and for each object position aligning the lens and opening the lens to expose the segments of the photosensitive material. The number of object positions is sufficient to substantially completely fill all photosensitive material segments disposed beneath the blocking portions of the line screen.

As a method, the present invention includes the following steps:

(A) spaced object locations are identified along an object path extending transversely of the central axis;

(B) the object the image of which is to be recorded is placed at one of the locations;

(C) the lens is placed at a lens location corresponding to the object location;

(D) the lens is opened to expose strips of the photosensitive material; and (E) the steps of placing the object, disposing the lens and opening the lens are repeated until the object has been photographed at all of the object locations.

BRIEF DESCRIPTION OF THE DRAWINGS

FIGS 5a and 5b are diagrammatic illustrations depicting how an observer sees the images recorded using the photographic arrangement of FIG. 4;

FIG. 6 is a diagrammatic illustration supplementary to FIGS. 5a and 5b for use in explaining how an observer receives and interprets the various image strips recorded on the transparency;

Corresponding reference characters indicate corresponding components throughout the several views of the drawings.

DESCRIPTION OF THE PREFERRED EMBODIMENTS

Figure 1:
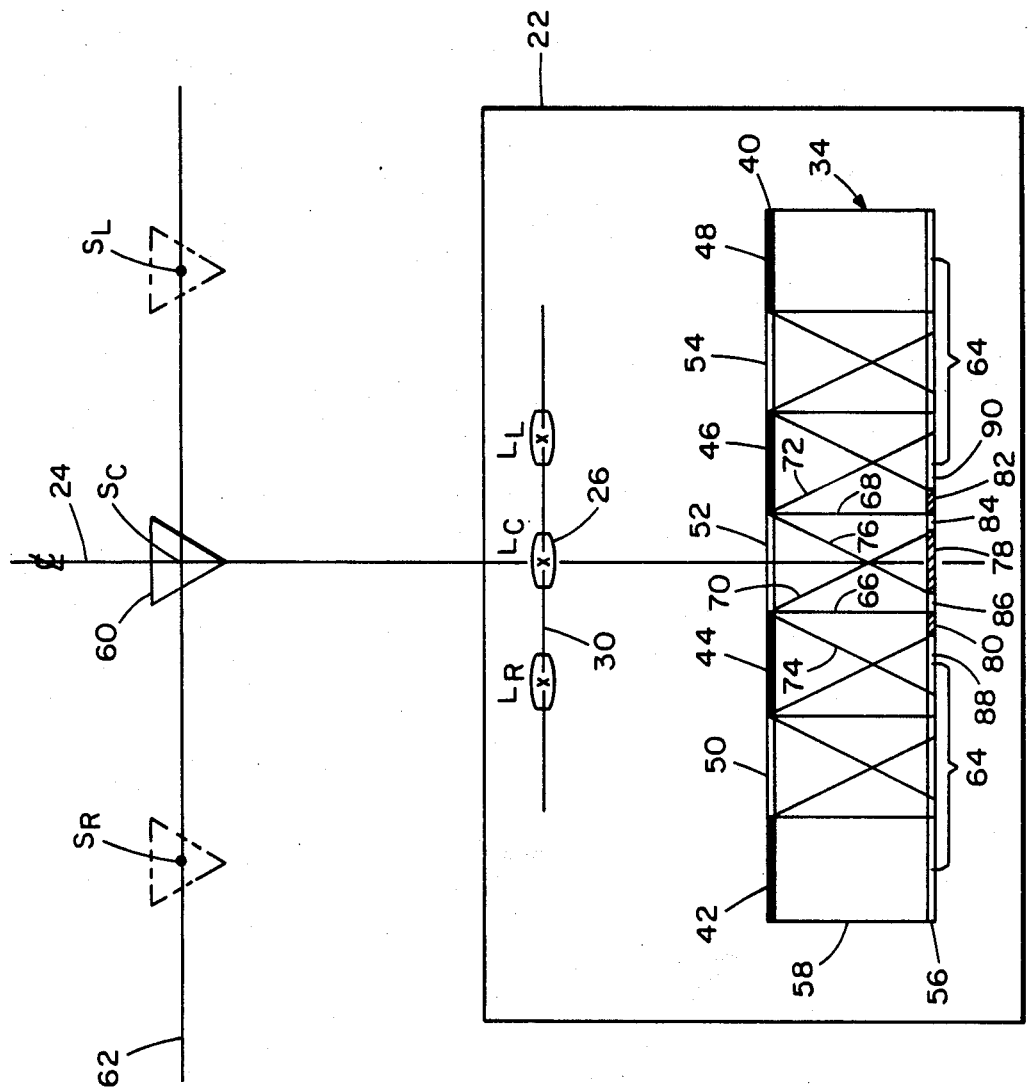
FIG. 1 is a simplified sectional view of a transparency assembly, with certain components removed, of the present inventon for providing a three-dimensional visual effect, showing, in diagrammatic form, lens positions and object positions related to image exposures on photosensitive material which is developed to form a transparency in the transparency assembly.
Figure 2:
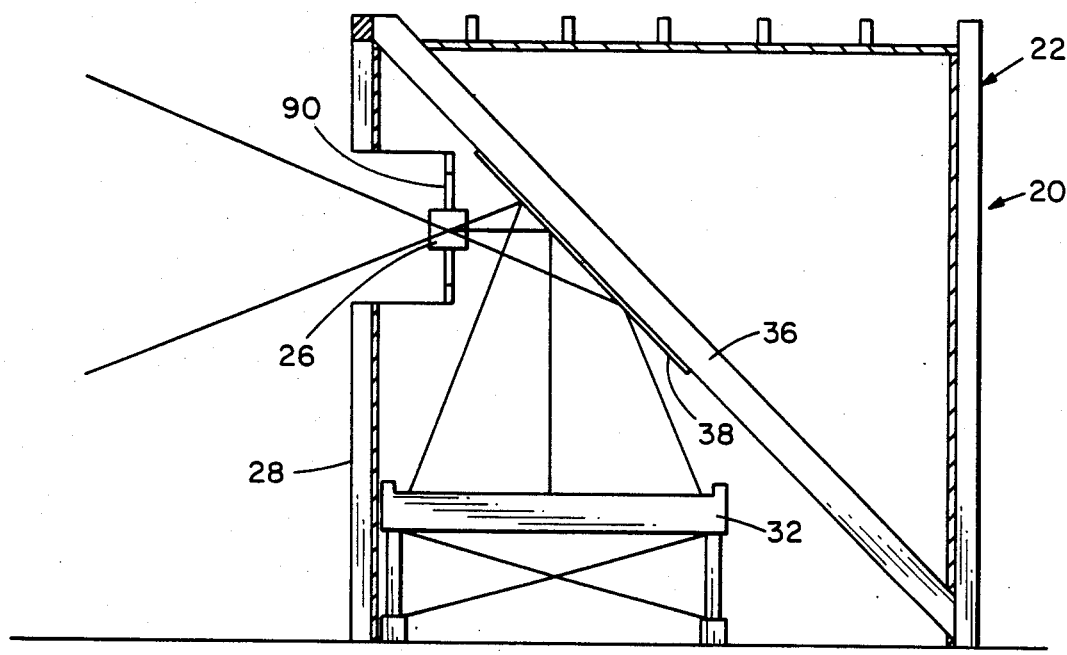
FIG. 2 is a side elevational view of a camera, with certain components removed, of the present invention for use in making the transparency assembly of FIG. 1.
Figure 3:
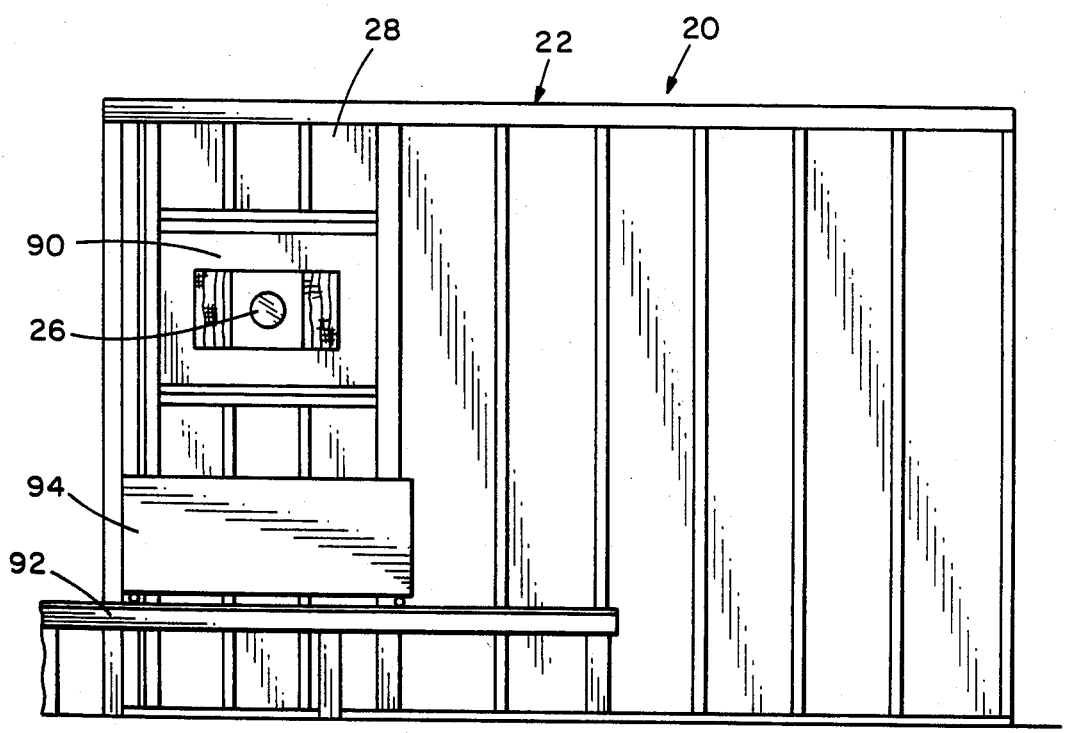
FIG. 3 elevational view of the camera of FIG. 2 showing a table for supporting a movable object stage positioned in front of the camera lens.

Referring now to the drawings, a camera for use in making three-dimensional effect transparencies is generally indicated in FIGS. 2 and 3 by reference numeral 20. The camera 20 comprises an enclosure 22 for prohibiting the entrance of light and having a central axis 24 (shown in FIG. 1). A lens 26 is mounted on a front wall 28 and is movable horizontally along a linear lens path 30 extending normal to the central axis 24. The camera also includes an elevated movable vacuum frame 32 for supporting a photosensitive material assembly 34 (best shown in FIG. 1). A 45° support wall 36 carries a front surface mirror 38 for reflecting the images transmitted by the lens 26 onto the photosensitive material assembly.

Referring to FIG. 1, the assembly 34, which is shown in greatly simplified form, greatly enlarged, and with certain components removed, comprises a line screen 40 having blocking portions 42, 44, 46, 48 spaced by the transparent portions 50, 52, 54. The assembly 34 also includes a layer of photosensitive material 56 and a transparent spacer 58, preferably made of plexiglass, disposed between the screen 40 and the layer. The assembly 34 also comprises frame means and alignment means (which will be discussed more fully hereinafter) for holding the components in precise alignment and which allow disassembly to permit development of the photosensitive material. The alignment means also permits reassembly using the resulting transparency with the transparency and line screen held in precise alignment.

An overview of the operation of the camera and how various strips of the photosensitive material layer are exposed, can be had with reference to FIG. 1. This simplification discounts lens action as well as the function of the mirror 38. The object 60 to be photographed is shown as being triangular and the object is movable along a linear object path 62 which is parallel to the lens path 30 and is normal to the central axis 24 of camera 20. The photosensitive material layer is considered to be divided into segments 64, corresponding in number and location to the transparent portions of the line screen, with each segment considered to extend from the midpoint of one blocking portion of the screen to the midpoint of the next adjacent blocking portion (projected down to layer 56). The object or subject and the lens are shown as each having three portions (center, left and right) although in the practice of the invention many more positions would be desirable. It is noted that the "left" or "right" designation is made with reference to the perspective of the object facing the camera.

The object 60 is placed in the center object position and the lens 26 is moved into alignment therewith at its center position. Opening of the lens results in passage of a beam of light having boundaries 66, 68 through transparent portion 52 of the line screen and its impinging on photosensitive layer 56. Next, the object is moved to the right subject position and the lens is moved to its right position in alignment with the object and the intersection of the camera central axis (projected by mirror 38) and the photosensitive assembly 34. Upon opening the lens, a beam of light having margins 70, 72 passes transparent portion 52 and falls on layer 56. Finally, the object and lens are moved to their respective left positions so that exposure results in a light beam having sides 74, 76 striking layer 56.

An analysis of the segment 64 of the photosensitive material layer 56 associated with transparent portion 52 indicates that a number of exposure strips have been formed, some strips have a single exposure and others having been subjected to double exposure. More specifically, a single exposure strip 78 has been formed resulting from the center exposure. Similarly, single exposure strips 80, 82 have been formed due to the left and right exposures, respectively. An intermediate double exposure strip 84, between strips 78 and 82, results from the central and right exposures through portion 52. Similarly, an intermediate double exposure strip 86, spacing single exposure strips 78 and 80, result from the central and the right exposures. Finally, the segment associated with transparent portion 52 of the line screen has a pair of fringe double exposure strips 88 and 90. Strip 88 results from a left exposure through transparent portion 52 and a right exposure through transparent portion 50 of the line screen. Similarly, strip 90 results from the overlap of a right exposure through line screen opening 52 and a left exposure through line screen opening 54. A similar analysis will identify the strips included in the photosensitive material segments 64 for line screen openings or transparent portions 50 and 54.

It will be appreciated that the intermediate double exposure strips 84 and 86 act as connectors of adjacent single exposure strips, in that they contain visual information accurately related to each of the adjoining single exposure strips. This is in sharp contrast to prior art three-dimensional representations having unexposed portions which contain no visual information. Even the fringe double exposed strips contain some visual information in that they act as extensions of the single exposure strip next to them because they contain visual information related to that single exposure strip. In typical usage, the ratio of fringe strips to other strips will decrease because there will be a much greater number of subject positions (causing a corresponding increase in the number of single exposure and intermediate double exposure strips) while the number of fringe strips per line screen opening will always be two.

The camera 20 produces life-like representations of objects in a one-to-one size ratio as well as a two-to-one enlarged ratio, or it can be adapted for other ratios. Due to the presence of mirror 38, the images have a correct right to left relationship rather than a reversed image. The transparencies produced using commonly available film can be as large as 48"×40" and as small as 20"×24" without encountering improper film to plexiglass spacer registration. The camera 20 also allows the operator, after the film has been loaded, to achieve all appropriate image and subject movements from the exterior of the camera. It has a fast exposure time depending on the type of film used, and allows the use of various line screen and plexiglass spacer combinations to produce a multiple variation of three-dimensional effects. The camera offers reproducible and consistent results, thereby allowing continuing refinements of the process. The simplicity of the camera construction allows a novice operator to be trained and successfully operate the camera with elementary instruction. The transparencies produced by this camera have great application for the advertising media, display media, and the art world.

A detailed description of one embodiment of camera 20 is as follows: The enclosure 22 is made of 2"×4" lumber and ⅜" thick particle board sheets forming a room having inside measurements of 8'×12'×8'H. The enclosure has an entrance forming a light trap with two 2'×8' halls, with a 2' wide entrance and exit which is shielded by an opaque curtain. This allows for easy access while maintaining total darkness. The enclosure 22 has a main exposing area partially defined by support wall 36 which is formed by two 4"×4" beams running from top to bottom diagonally. These beams are used to support a 32"×50" size front surface, 92% reflectance, optically flat mirror 38. Just below the mirror is a 2"×4" structure used to support a 52"×2" vacuum frame 32. The height from the floor to the film 56 in the vacuum frame is 24". The vacuum frame 32 is fitted with four 4-wheel trucks which in turn travel inside two aluminum channels which allow the vacuum frame to be moved in and out from under the front surface mirror 38. A 36"×24"×16"D lens box is fitted 4½' above the floor and centered right to left with the front surface mirror. The lens box is removable, which allows it to be recessed 12" for one-to-one performance and to be reversed and protrude some 18 inches for two-to-one enlargement. The rear of the lens box contains a movable lens board 90 which allows the lens to be moved six inches to the right and six inches to the left of the central axis 24. This lens board has been constructed to be light tight during the lens shifts. The lens used is a 30" Apro-Nikkor. In the recessed position of the lens box, the lens is 60" from the film plane in the vacuum frame. In the protruding position, it is 90 inches from the film plane. The minimum distance of 60" creates the one-to-one image. The maximum distance of 90" creates a two-to-one enlargement. The lens box can be placed at intermediate distances to allow varied amounts of enlargement from one-to-one, to two-to-one.

Located in front of the wall containing the lens box outside of the camera 20 is a 4'×8'×18" high object table 92. The 8' dimension of the table extends parallel to the front wall 28 of the enclosure containing the lens box. The 8' dimension is centered on the lens mirror vacuum frame axis. The 4' dimension center is located some 45" from the wall 28, or 60" from the lens in its recessed one-to-one position. The table is constructed of 4"×4" timbers and has six 4"×4"×18" legs anchored to the floor to create an extremely stable condition. On top of the table is a 4'×4'×20" stage 94 constructed of ¾" thick plywood. This stage is mounted on two aluminum tracks with a 4-wheel truck in each corner. This allows the stage to be moved on the object path 62 parallel to the lens movement path 30. The object or model to be photographed is positioned on stage 94.

Attached to the base of the stage on the right and left side are lengths of one inch steel tubing used to support four 1500 watt pulse xenon light sources two on each side of the stage. This allows the stage and lights to move in unison parallel to the lens movements and perpendicular to the central axis 24 of the camera.

When a subject is to be photographed one-to-one, it would be placed on the stage and adjusted for distance from the lens and for height from left to right orientation by viewing its image projected through the lens in the center position onto a white card located on the vacuum frame. This position is marked on the surface of the table in relation to the movable stage, as the center position. The amount of the right to left movement of the lens will be dictated by the thickness of the plexiglass spacer 58, the number of lines per inch in the line screen and the distance the lens is from the line screen. Once that amount of movement has been determined, the number of images desired to be placed on the line screen is determined. The percentage of the line screen opening to the line screen block dictates the optimum number of images that can be placed on the transparency. For example, 50% line screen, 50% block can contain only three images. A ten percent line screen to 90% block could contain 15 images. The more images, the more stereo pairs, therefore, a smoother more true-to-life three-dimensional transparency. The camera 20 and stage 94 are capable of handling any number of different combinations of the above, in a repeatable predictable manner. The stage will be moved to change the subject perspective in accordance with the factors outlined above. For example, with a ¼" thick plexiglass spacer 58 with an 85 line per inch line screen 40, with a 20% opening to 80% block, with the subject to be shot at one-to-one, the number of images (exposures) is nine. The ¼" plexiglass with 85 lines at one-to-one dictates a 4½" total lens movement. Nine images dictates ½ of an inch of movement per exposure because four and one-half inches of total movement divided by nine exposures equals ½" of movement for each exposure.

With nine exposures, the center lens position would be considered exposure #5. With ½ of an inch of lens movement needed for each exposure, four ½" rulings would be made to the right and left of lens center; these would be numbered one through nine. A mark would be made on the white card in the vacuum frame corresponding to a near center image of the subject where the projection and recession transition is to be located. The lens would be then moved to position #1. The stage 94 would be moved in the same direction as the lens and adjusted so the subject mark coincides with the subject in this new perspective position. A mark would be made and labelled position #1 on the box stage table. The lens would then be moved to position #2 and the stage adjusted for correct alignment again. This position would be marked #2, and so on, with 3 and 4. Five would be already marked as center position on the box-stage table. Continuation would then be made for positions 6, 7, 8 and 9. After this calibrating of the perspective positions of the stage, photographing the three-dimensional plate is commenced. Suitable photographic tests would be made to obtain the F-stop and time combinations necessary for the proper exposure. Also, color filters if needed would be added in front of the lens.

The exposure sequence would be as follows: A ¼" thick piece of plexiglass spacer 58 with a line screen 40 laminated on one side, would have a registration slip attached to one edge on the side opposite the line screen. This registration strip would be one inch wide, 0.030 inch thick plastic. It is secured to the plexiglass by ½ of an inch of transfer adhesive down its entire length. It is attached in such a manner that ½" of it protrudes from the plexiglass and ½" is adhered to the plexiglass. The plexiglass spacer is placed in the vacuum frame 32 with the line screen side up and the registration strip towards the operator. A series of positioning strips made of ¼" hardboard are located in the vacuum frame to allow proper positioning of the plexiglass spacer in the dark. With the room dark, a piece of transparency film is placed under the plexiglass spacer. The film and the plexiglass are aligned in their proper position according to the hardboard strips. Using a ¼" hand punch, a hole is punched through the ½" protruding portion of the registration strip and through the film. A brass registration pin is placed from beneath the film through the registration slip, and held in place by a small piece of adhesive tape. Another punched hole and pin is placed every 15 to 20 inches; meaning that there must be a minimum of two pins and a maximum of five depending on the size of the plexiglass. A strip of ¼" hardboard is placed over the registration strip so that during the vacuuming procedure, the strip would not be bent around the edge of the plexiglass spacer. The vacuum frame 32 is closed and locked, the vacuum pump turned on and the frame slid on the tracks into position under the front surface mirror. On the outside, the lens is moved to position #1; the stage is moved to position #1; and the first exposure made. At the end of the first exposure, the lens is moved to position #2; the stage is moved to position #2, and so on, until all the exposures are completed. The film would then be removed from the vacuum frame 32 being careful to remove the registration pins. It would then be processed, and after processing, registered with the plexiglass spacer and laminated into position. The result would be a three-dimensional effect transparency when illuminated from behind.

The optimum viewing distances, the amount of enlargement of the subject, the depth, and protrusion of the Z-axis, all influence the methodology used in the production of the transparency. This device has sufficient adjustments to allow it to handle most, if not all of these production variables.

The camera 20 and its method of use represents a novel approach for creating in a direct manner, large three-dimensional transparencies utilizing a single lens and line screen masking. Although the prior art includes methods for producing three-dimensional images within the camera, problems of reversed or flopped images, and pseudoscopic images; that is, right eye viewing left segments and left eye viewing right segments, have not been simply and easily overcome. Also, lenticular screens and line screens have been used but in such manner as to make it difficult to fill the entire space under each lenticule or line. The present invention teaches a method of filling that space in total with relative simplicity, in order to take advantage of the improved quality of the image formed. Also this method allows substantially greater viewing distances with a greater variety of viewing angles from the perpendicular compared to systems using lenticular screens or optically active line screens.

The camera 20 used to photograph the three-dimensional transparency is of a size and scope to allow it to contain sufficient area for equipment large enough to photograph a 20"×24" and larger transparencies. The maximum size will only be limited by common film widths and equipment.

The camera contains a vacuum frame 32 of sufficient size to hold the maximum size line screen film assembly. A 30" lens 26 is selected to cover the field of transparency. The front surface mirror 38 is positioned in a horizontal manner that will reflect the image from the lens down to the vacuum frame. The angle is 45° from the vertical in order not to inflict any distortion upon the image. The lens is caused to slide to the right and left of its optical center line. The subject is placed on a track that allows it to move on the path 62 perpendicular to the optical axis of the lens, and parallel to the right-left movement of the lens on path 30. An exposure sequence takes place in which the subject is moved to the right of the optical center of the lens and the lens is moved to the right of its optical center line but proportionally less than the subject has been moved. This creates the right walleyed position; that image will then pass through the line screen mask and record a line form (strip) to be viewed by the left eye of the observer viewing the finished transparency. This right walleyed view is in fact the same as a left cross-eyed view. On the opposite side, the converse will be true, since the mirror will reverse the overall image and the walleyed system of line form spacing will give a true streoscopic view. The resulting transparency when viewed through the line screen it was photographed through, will directly produce a dynamic correct reading true stereoscopic transparency. The line screen mask is used in such a manner as to allow the total transparent width of the line screen opening to expose a line form equal to its width on the photosensitive material thereby allowing line form images to abut and preferably overlap each other in order that they totally fill the space beneath each line or blocking portion of the line screen. A continuous smoothly flowing totally exposed image is created. Because of the simplicity of the line mask image forming, the amount of ocular pairs that can be stored in the form of various aspect exposures can be optimized for the specific use of creating the most dynamic three-dimensional image at the greatest number of viewing distances and viewing angles. This is done by creating bundles of true stereoscopic images in each segment of the transparency associated with a corresponding blocking portion of the line screen. Also, the greater number of exposures that are used, the greater the degree of roundness and smoothness is obtained. An amount of overlap (double exposure strips) aids in the transition from one single exposure strip to another without inducing any loss in the detail. Also, the central plane, the transition from projection to recession of the transparency, can be selected at will and placed at the most advantageous position. These combinations of the thickness of the line screen photosensitive spacer, the number of lines per inch of the line screen, the percentage of line screen opening to the closing ratio, the number of exposures, and the amount of movement from optical center for subject and lens afford various large ranges of viewing distances and various angles of optimum three-dimensional viewing from the perpendicular.

A flexible or ridged film assembly can be constructed where the upper layer will contain a line screen with a base spacer, followed on the bottom by a photosensitive transparency emulsion. The creation of such a sandwich eliminates any difficulties encountered in registering the line screen and plexiglass spacer, with a photosensitive film before and after exposure and processing.

An object could be photographed in 360° using the cameras and systems described here. By rotating as well as moving the subject between exposures on a series of four 48"×40" transparencies on a relatively flexible separating media, four finished transparencies could be attached to one another and bent into a circle to form a 360° Kiosk.

Further, the use of double line screen masking system on the face of a vertically positioned scanning CRT will allow the separation of right and left eyed cameras by utilizing sequential high resolution scanning or two electron gun output with their interlocked imaged spacing. This would allow right and left eye information to be stored under the line screen mask and to be visible to the appropriate eye when the CRT is approached at the optimum distance. This distance can be easily controlled by the spacing of the line screen mask from the CRT face.

Finally, a projection device can be constructed in such a manner as to have a series of lenses whose optical axis are evenly spaced right to left and perpendicular to the projection screen. In the case of back projection, the screen would consist of a line screen mask separated from the screen itself by a spacer of some kind with the front of the screen having a duplicate spacer with an identical line screen mask aligned with the rear line screen mask. In front projection, the line screen mask would contain light absorbing material on its blocked out portions, then a spacer and reflective screen material. The line form images projected onto these screens by the lines will be viewed as bundles of true stereoscopic images by an observer, over great and varied distances and at a large variety of angles other than perpendicular. These bundles of true stereoscopic information will allow viewers to position themselves at a large number of positions and distances relative to the screen, unlike systems now in existence. Further, the observer can turn his head from side-to-side and yet maintain a true stereoscopic view of the entire screen. This projection could be either still or in motion.

Figure 4:
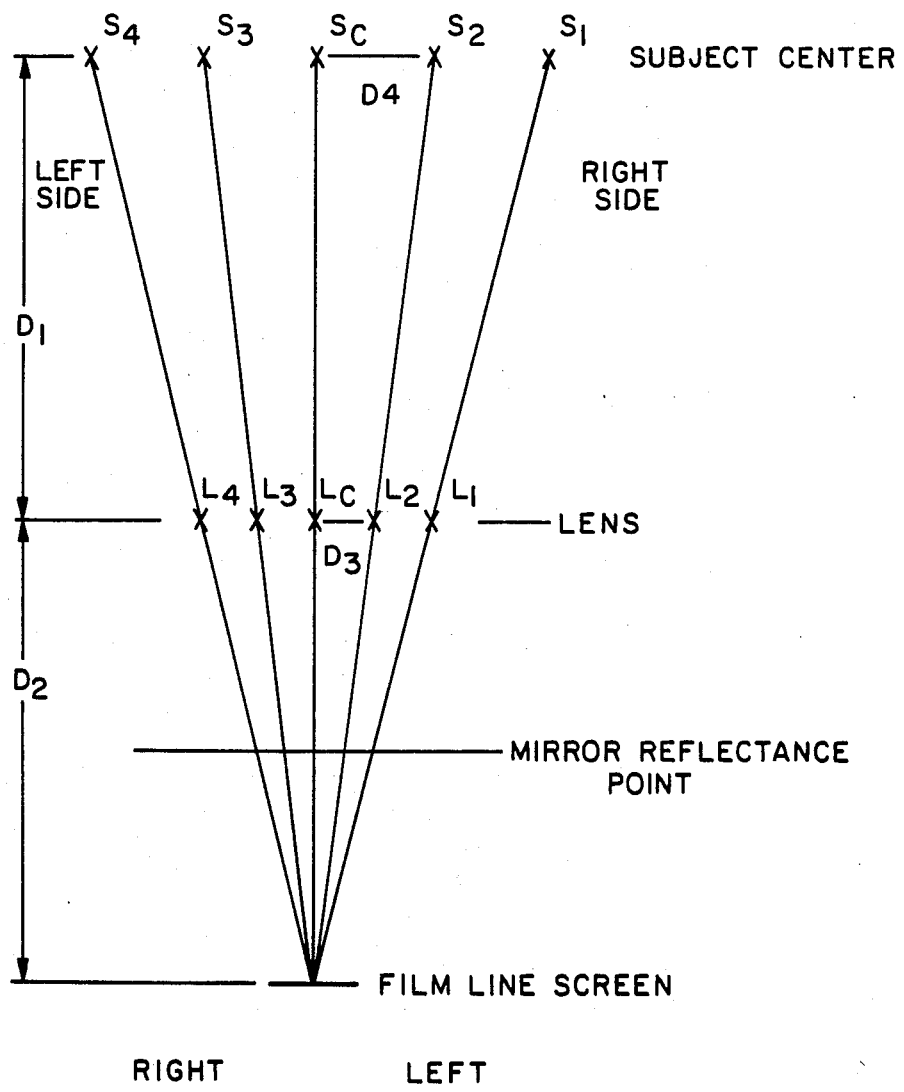
FIG. 4 is a diagrammatic illustration showing a one-to-one photographing arrangement using the present invention.

A detailed explanation of the walleyed system of photographing an object is as follows: FIG. 4 represents a one-to-one view of photographing subject S through lens L. The distance D1 (from the subject to lens) is equal to the distance D2 (from film to lens) because of the one-to-one exposure ratio. Referring to FIG. 5a, it is shown how the center of the image rays form images 1, 2, C, 3 and 4 on the photosensitive material. The distance of D3 (shown in FIG. 4), that is the distance the lens will be moved from its optical 20 center position, is calculated by the determining the distance the image is to be displaced on the photosensitive material. Once D3 has been determined, D4 (the distance the subject must be moved from the axis 24) will be exactly twice D3. The subject is moved two D4 incremental distances to the right so that it is in subject position 1. The lens is correspondingly moved to the right two incremental D3 distances so the lens will be in position L1. According to FIG. 5a, with the subject in position S1 and lens in position L1, the image I1 will be formed. In FIG. 5b, similar to FIG. 5a, except the film has been developed to form a transparency, an observer looking through the line screen mask from the same direction that the original subject was photographed will see with his left eye image I1 and with his right eye image I4. Now, although the subject is to the right and the taking lens is to the right, those two positions interpret as if it is a right walleyed position.

Referring to FIG. 6, the lens is in the L1 position and the subject is in the S1 position. The left eye of an observer has been added. Also added is the subject in the S4 position, the lens in the L4 position and that now will become the right eye of the observer. The additional right and left eyes in FIG. 6 show how the lens in the right position will actually form the aspect of the eye in the left position and the lens in the left position will actually form the cross-eyed aspect of the eye in the right position thereby directly producing a true stereoscopic viewpoint.

Figure 7:
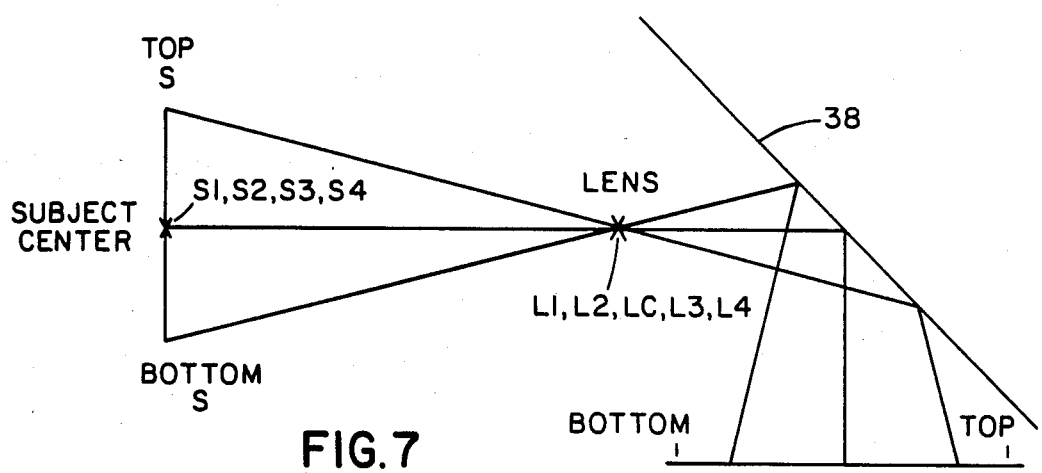
FIG. 7 is a diagrammatic illustration representing a side elevation of the camera of FIG. 2 showing the function of a 45° mirror in the camera preventing object reversal.

Referring to FIG. 7, the centers of subjects Sl, S2, SC, S3 and S4 all align for this in a side view of the subject being photographed. Also, lens positions L1, L2, LC, L3 and L4 all align because it is a side view. The mirror 38 in its 45° position will reflect these center positions directly upon the line screen as depicted by the middle reflection. FIG. 7 also shows the top of the subject and the bottom of the subject and how the top and bottom of the subject are interchanged or folded by the 45° mirror, thereby reversing the subject so that the subject may be viewed directly through the same site through which it was photographed, presenting a correct right to left relationship as well as a correct stereoscopic relationship.

Figure 8:
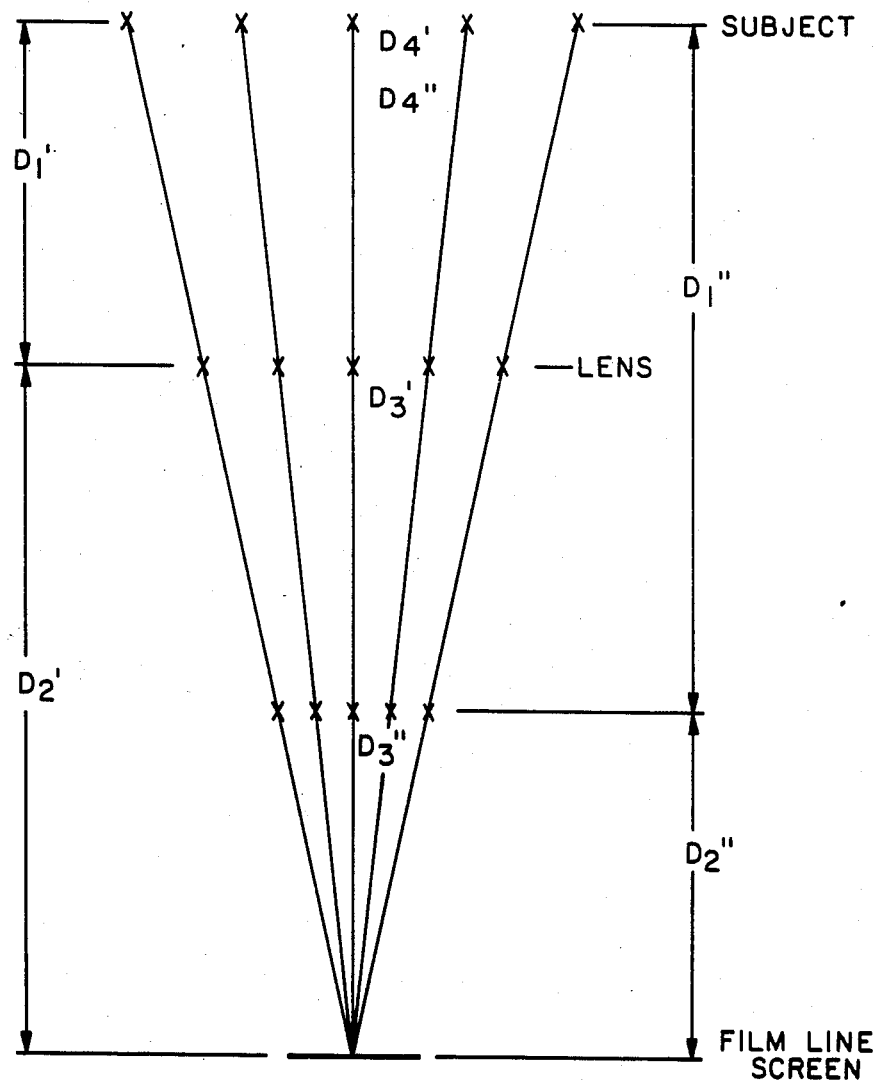
FIG. 8 is a diagrammatic illustration similar to FIG. 4 except showing a two-to-one and one-to-two photographing arrangement.

Referring to FIG. 8, it is shown how the movements of the lens, D3' and D3", change as the camera goes from a two-to-one and a one-to-two position. Also, the corresponding positions of the subject will change, thereby creating D4' and D4" depending on whether or not the camera is in a two-to-one or one-to-two ratio.

Figure 9A:
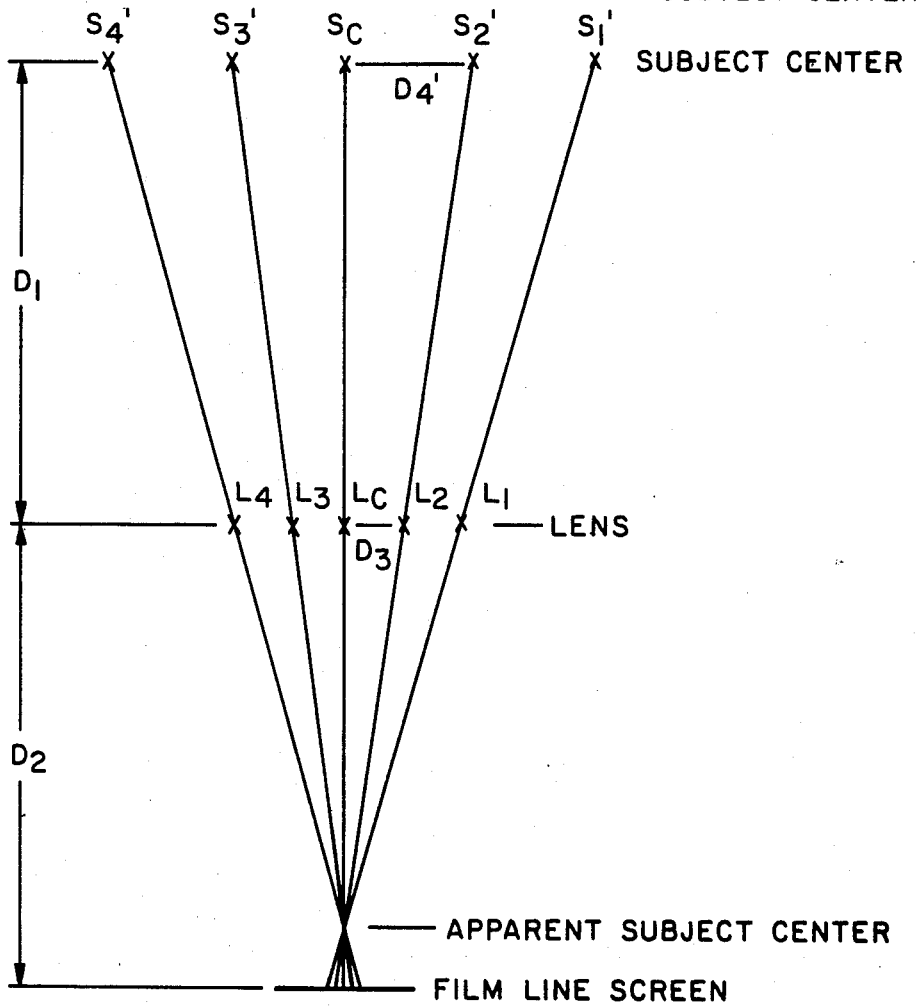
FIGS. 9a–9d, similar to FIG. 4, illustrate how movement of the lens or the subject results in projection or recession of the object.
Figure 9B:
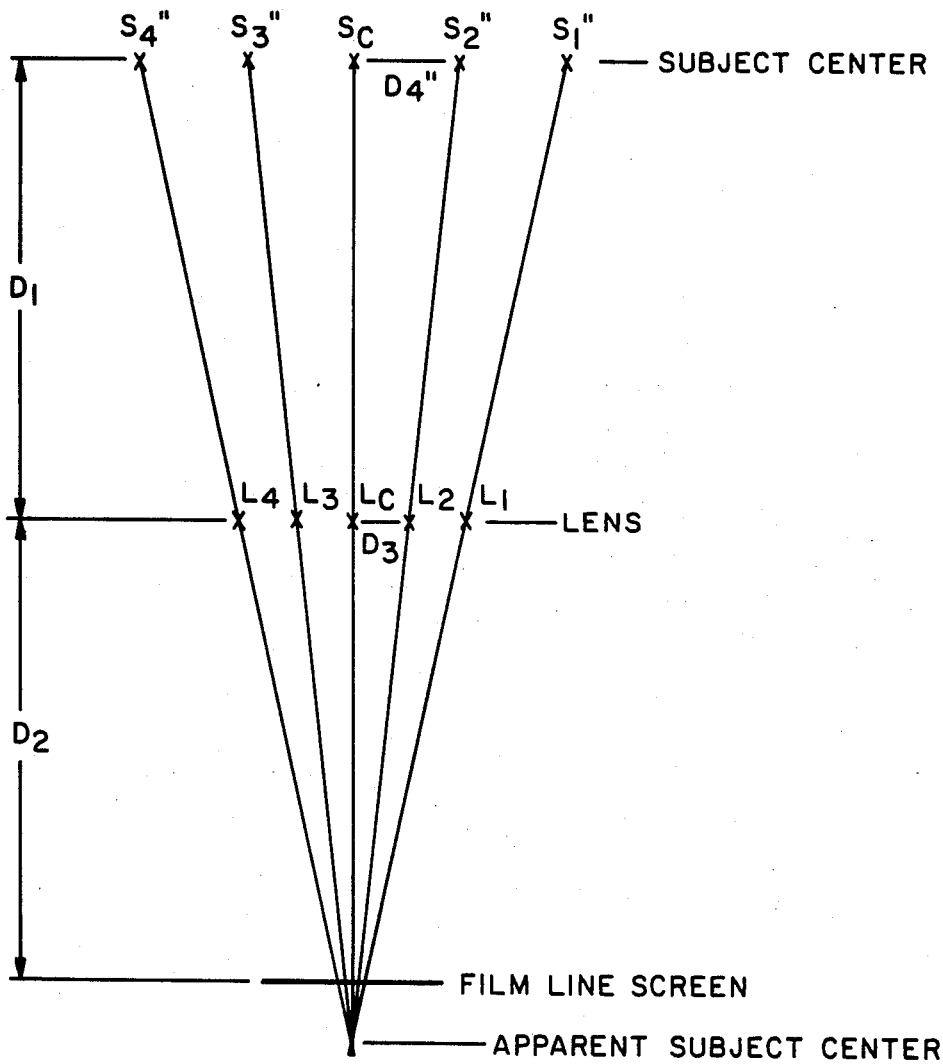
Figure 9C:
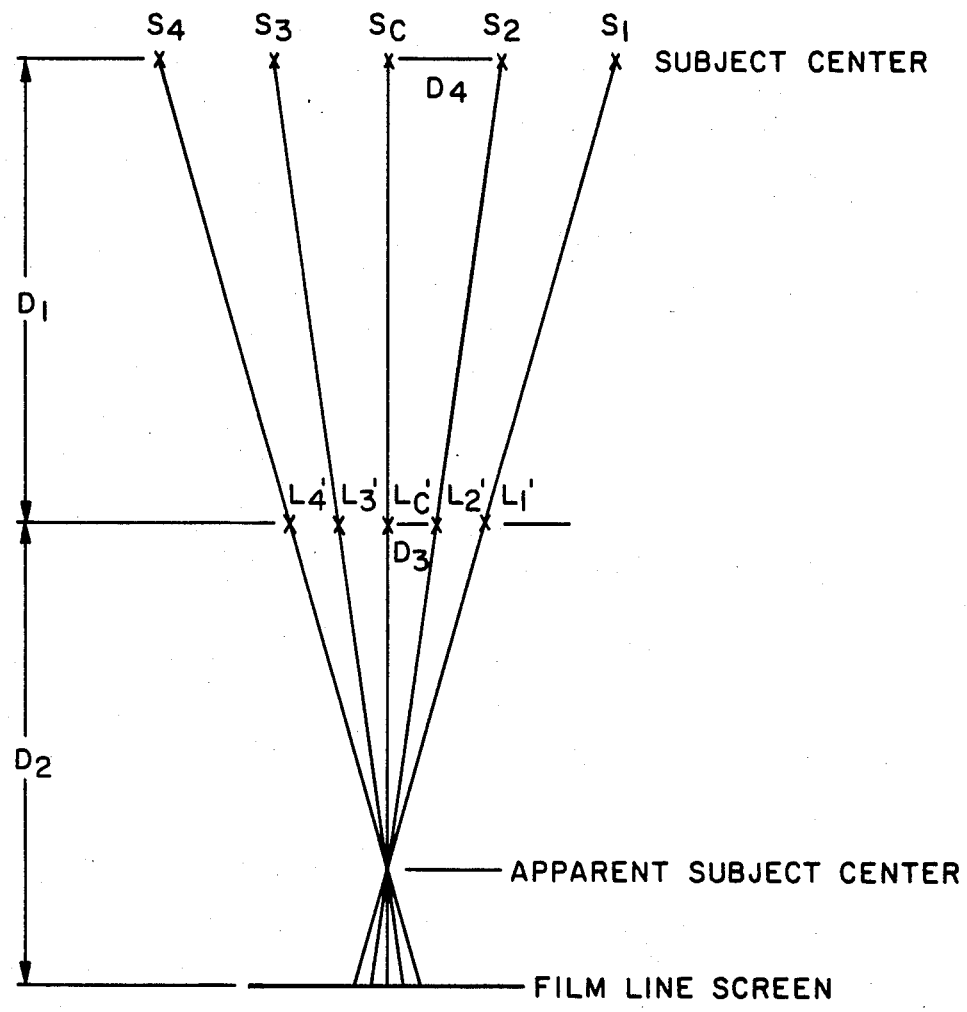
Figure 9D:
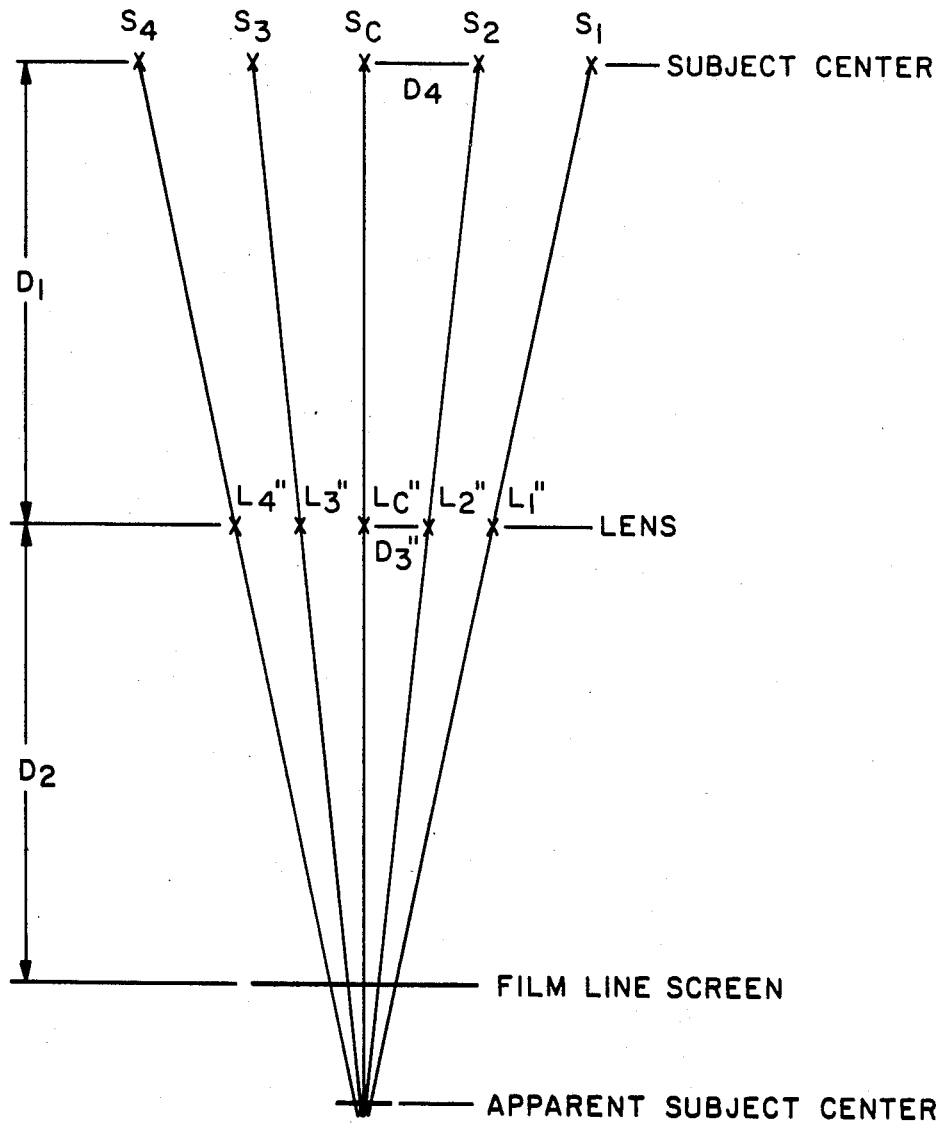

FIGS. 9a-9d when compared to FIG. 4 show how the transitionary plane from the projection to recession of the subject can be changed by simply adjusting either the movement of the subject or the lens. Referring to FIG. 9a, by increasing D4 to D4', the subject is moved into position S2', S1' and so on. The apparent center of the subject will then move forward from the line screen position it has been in before. In FIG. 9b, the changing of D4 or reducing the amount of movement of the subject to D4" causes the apparent center of the subject to appear to be behind the center of the line screen transition. By changing the lens movement to a smaller dimension and maintaining D4, again the subject apparent center will seem to move toward a projected position in front of the line screen center, as shown in FIG. 9c. By increasing the lens movement to D3" and leaving the subject distance at D4, again the subject center will appear to be behind the film line screen center, as shown in FIG. 9d. It is assumed in all FIGS. 4, 9a-9d that the line screen is in a vertical position when viewing and in such a position when being photographed upon, as to imitate a vertical position. It is also pointed out that although five subject and lens positions are shown here, many more subject and lens positions can be used. Five is used chosen for purposes of clarity and ease of understanding.

In reference to FIG. 4, distance D2 will be the closest distance an observer to the line screen can see coherent true stereoscopic effects in moving his head even to the right and left positions. Closer than distance D2, the individual will experience some stereoscopic effects, but the increasingly large number of other effects are present that are confusing to the eye. Beyond distance D2, the observer will see series after series of coherent stereoscopic positions allowing viewing to take place at a great number of varied distances and a great number of varied angles from the perpendicular. The three-dimensional images will be maintained until the narrowest of the ocular pairs exceeds an observer's eye spacing. The image will then appear to have a normal two dimensional appearance, for the eye itself only maintains an actual 3D perception of things to a distance of approximately 50 feet. The more positions that the subject is photographed in, the more images placed in strip form storage beneath the line screen. Thus, more intersecting positions through stereoscopic viewing will take place allowing an observer to move around in front of the line screen transparency to the right and to the left and forward and back. In each one of these positions, the observer is able to maintain many different intersecting true stereoscopic views. These bundles of stereoscopic information will radiate from the transparency assembly in such a manner as to intersect literally thousands of times. This varies from the normal prior art method of storage in that only limited viewing distances and limited viewing angles are afforded. The transparency assembly of the present invention, by increasing the number of exposures, allows a geometric increase in the number of true stereo intersections. The only limiting factor is that the observer should not approach closer than dimension D2. The number of radiant bundles at that point will cause a loss to some degree of the true stereoscopic effect. But since this transparency assembly is meant for display, the achieving of a minimum viewing distance allows it to be used more readily in a display medium.

Figure 10:
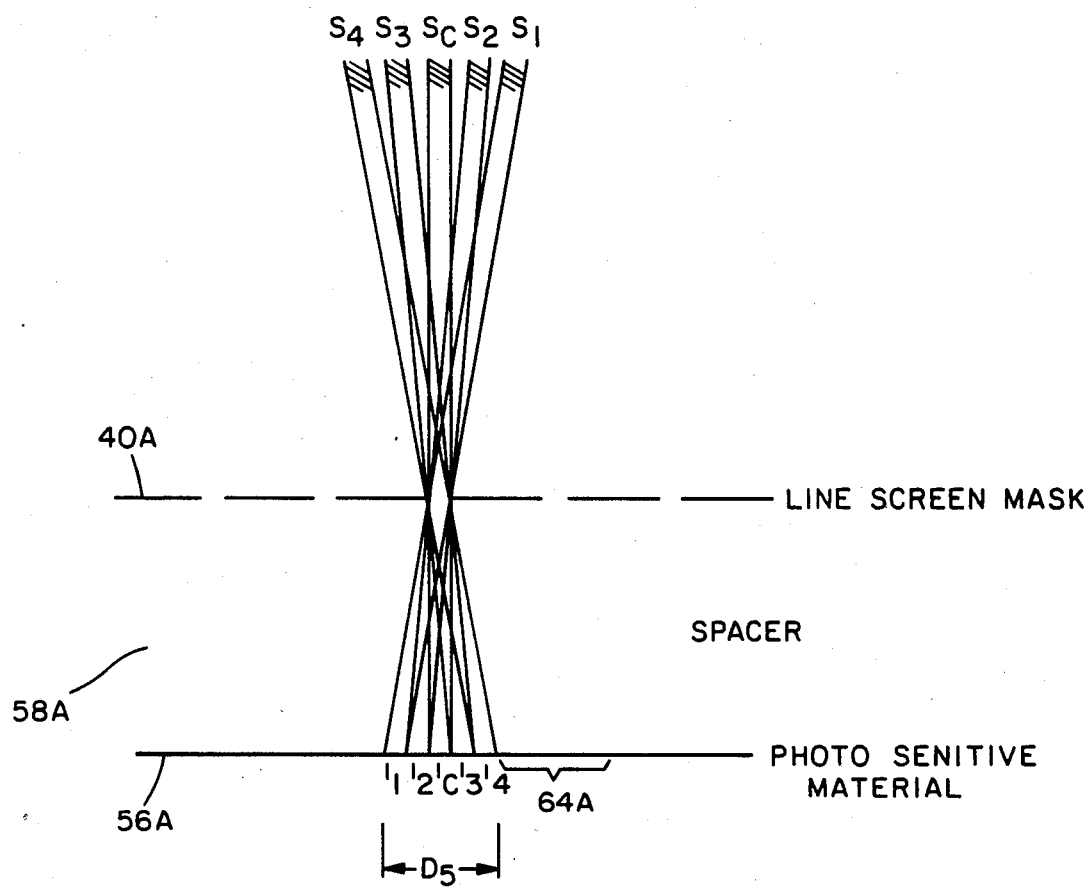
FIG. 10, similar to FIG. 1, depicts a transparency assembly using 80% blockage in the line screen.

Referring to FIG. 10, the line screen 40A masks the photosensitive material layer 56A beneath the spacer 58A, but yet allows the entire width of its transparent portion to expose a corresponding layer segment 64A. S1 exposes image 1 and so on. The line screen shown in FIG. 10 has a 20% opening and an 80% block and it is used to expose five images. Each one of those images (strips) takes up 20% of the photosensitive material beneath the line entity, thereby totally filling the line entity. In practice, four intermediate exposures would be installed, one between S1 and S2, one between S2 and SC, one between SC and S3, and one between S3 and S4. These intermediate exposures would slightly overlap the corresponding images. Image 1 would be overlapped by the intervening image between image 1 and image 2, just as image 2 would be slightly overlapped by the intervening image between image 2 and image center and so on. Those overlapping image strips would prove to allow not only additional bundles of stereoscopic information but would assure that every bit of photosensitive material under the line was used in total. Resulting overlap strips would not cause any loss in detail but in fact enhance the amount of stereoscopic pairs that are available for viewing.

As noted in FIG. 10, dimension D5, the total segment width available for exposure beneath one transparent portion of the line screen, will then directly interpret by proportion to dimension D3. In turn, dimension D3 will interpret by proportion to dimension D4 depending upon whether the camera is in a one-to-one, two-to-one, or one-to-two position. This relatively simple relationship of the layer segment and the movements necessary to fill that segment allow the segment to be filled in total very easily.

In order to create the greatest number of ocular pairs into bundles of stereo information that will be admitted or radiated from the transparency assembly, it is necessary to keep the total of all the D3 dimensions as small as practical. The only limitation is that the total of all of the D3 dimensions is in excess of a normal ocular spacing, that is approximately $2\frac{1}{2}$ to $2\frac{3}{4}$ inches. The spacer to line width ratio will then dictate the D3, D2 ratio. The number of exposures that can be easily placed and retrieved beneath the line will depend on the width of the line screen opening. The wider the transparent portion, the smaller number of exposures that will be contained in this stereoscopic bundle. The smaller the opening, compared to the closing, that is 50% to 50%, 90% to 10% opening, will allow the greater number of individual exposures within the stereoscopic line screen bundle. An opening of 10% with a closing of 90% should allow the placement of 15 various aspects from right to left to be stored beneath a single transparent portion. Those strips that are stored will be overlapped one upon another to such a degree as to not interfere with the reproduction of the total image detail. Yet, the amount of stereo information contained in each bundle as it radiates from the plate will allow a tremendous increase in the number of true stereo insections taking place at distances greater than D2. The greater number of these intersections, the more comfortable and accurate viewing positions can be found by an observer at a distance greater than D2.

Previously discussed were registration systems wherein the line screen and plexiglass spacer can be registered to a photosensitive emulsion during exposure. After exposure, it can be processed and then registered to the photosensitive emulsion to reproduce a dynamic transparency. This reregistration could be eliminated by making a line screen, spacer, photosensitive emulsion material in one piece either rigid, semi-rigid or flexible. The manufacture of such a material would ease this process so that the reregistration of the end product is unnecessary. There are many line screen products which do not contain silver and there are methods of protecting the line screen on this composite material from deterioration of the silver during processing. The processing of such a large rigid transparency could easily be accomplished by a dip dunk system of the type known to those skilled in the art.

The position of the transitional plane, that is the area of change from projection to recession of the line screen transparency was previously discussed. FIGS. 9a-9d illustrate that this line screen transparency center can be displaced to the rear and in front as well as on the center of the plane by ohanges in D3 and D4, that is by subject and lens movements. It also can be changed by actually moving the subject forward and to the rear when the transitionary plane has been preestablished. Referring to FIG. 9b, a subject center could be placed to the rear of the line screen by reducing the subject movement between exposures. In fact, if coupled with the reduction of this distance D4" the subject is rotated a number of degrees to the right or left as the subject is photographed, a transparency would be formed in which the subject would appear to turn in front of the observer as the observer moved either to the right or left of the subject. Carrying this method further, the subject movement could be reduced to a bare minimum and the rotation increased to coincide with the number of exposures necessary to make a series of four transparencies. If each transparency contained nine exposures, and each rotation would include 10° of subject movement, four transparencies would net 360° of subject movement. When the four transparencies are placed together in a manner whereby their adjacent sides are coupled and the resultant formed into a cylinder, the subject could appear to be at the center of that cylinder. As the observer moved around the cylinder, the subject would appear to rotate either in the same or opposite direction depending upon the rotation at the time of photographing. This would afford a complete 360° view of the subject. The system would have to be changed in that the spacer for the line screen would have to be thin enough to allow bending the line screen over 90°.

Figure 11:
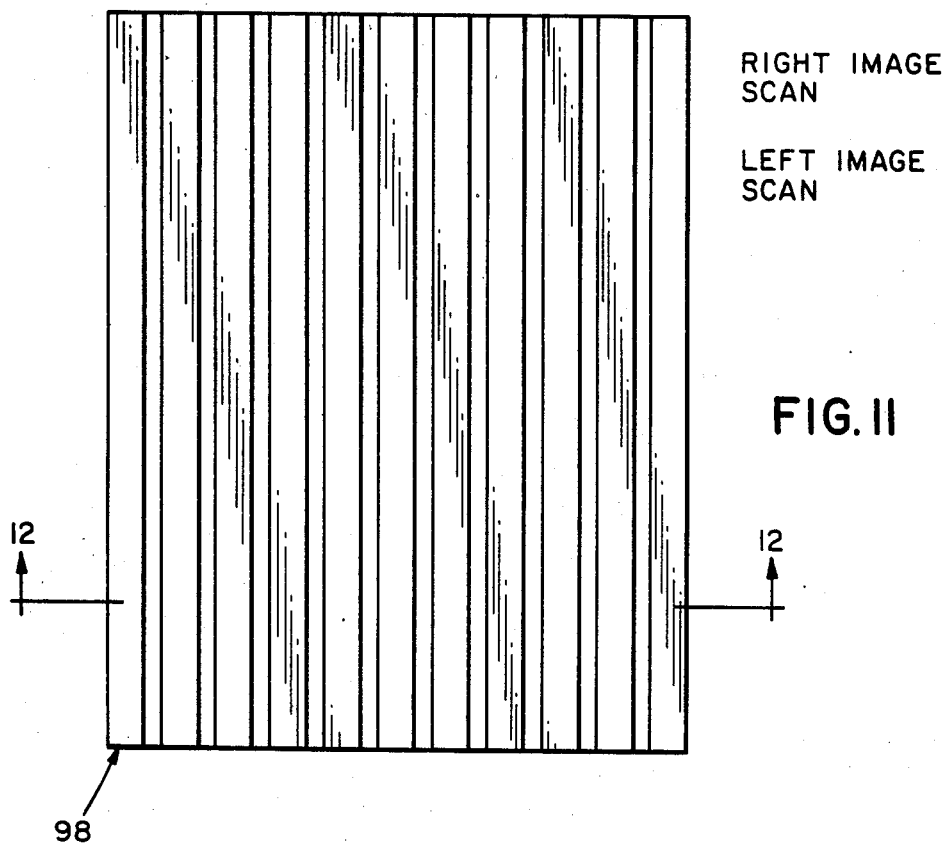
FIG. 11 is a plan of a line screen assembly for use with a cathode ray tube.
Figure 12:
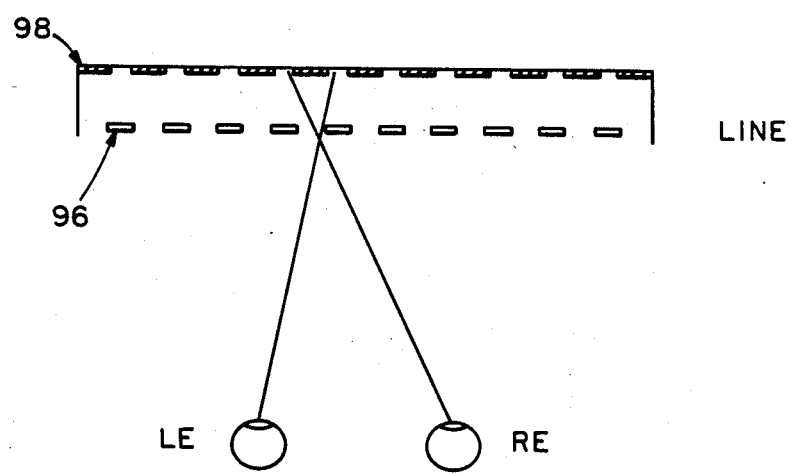
FIG. 12 is a sectional view taken along line 12—12 of FIG. 11. illustrating how an observer would view the assembly.

Referring to FIGS. 11 and 12, a variation on the theme of line screen masking is shown wherein interlocking masks 96, 98 are applied to the face of a cathode ray tube. The outer mask 96 is placed a distance or spaced away from the mask 98 that is applied directly to the face of the tube. Thereby, when viewed at a large distance, the tube would appear to be totally covered by the mask combination. When viewed at an optimum distance, the right eye could view a right eyed image which would be hidden under a left portion of the mask and the left eye could view a left eye image which would be hidden on the right eye portion of the mask. This optimum distance could be adjusted by increasing or decreasing the thickness the spacing between the masks. The easiest method for the scanning to take place would be to put the cathode ray tube in a vertical rather than horizontal position, thereby the scanning would take place parallel to the masked lines. The right images would be fed to either a separate electron gun or an "every other" scan system. The left images would be fed to the remaining scan with distances allowing the right and left images to be formed under the blocking over mask allowing the eye then to see the right and left eye images at the optimum viewing distance. Although the viewing distance would be relatively regulated, it would allow for some movement to the right and left and back and forth. Video images thus provided should maintain a great deal of three-dimensional separation and have immediate application in fixed installations such as video display terminals or video game production.

Figure 13:
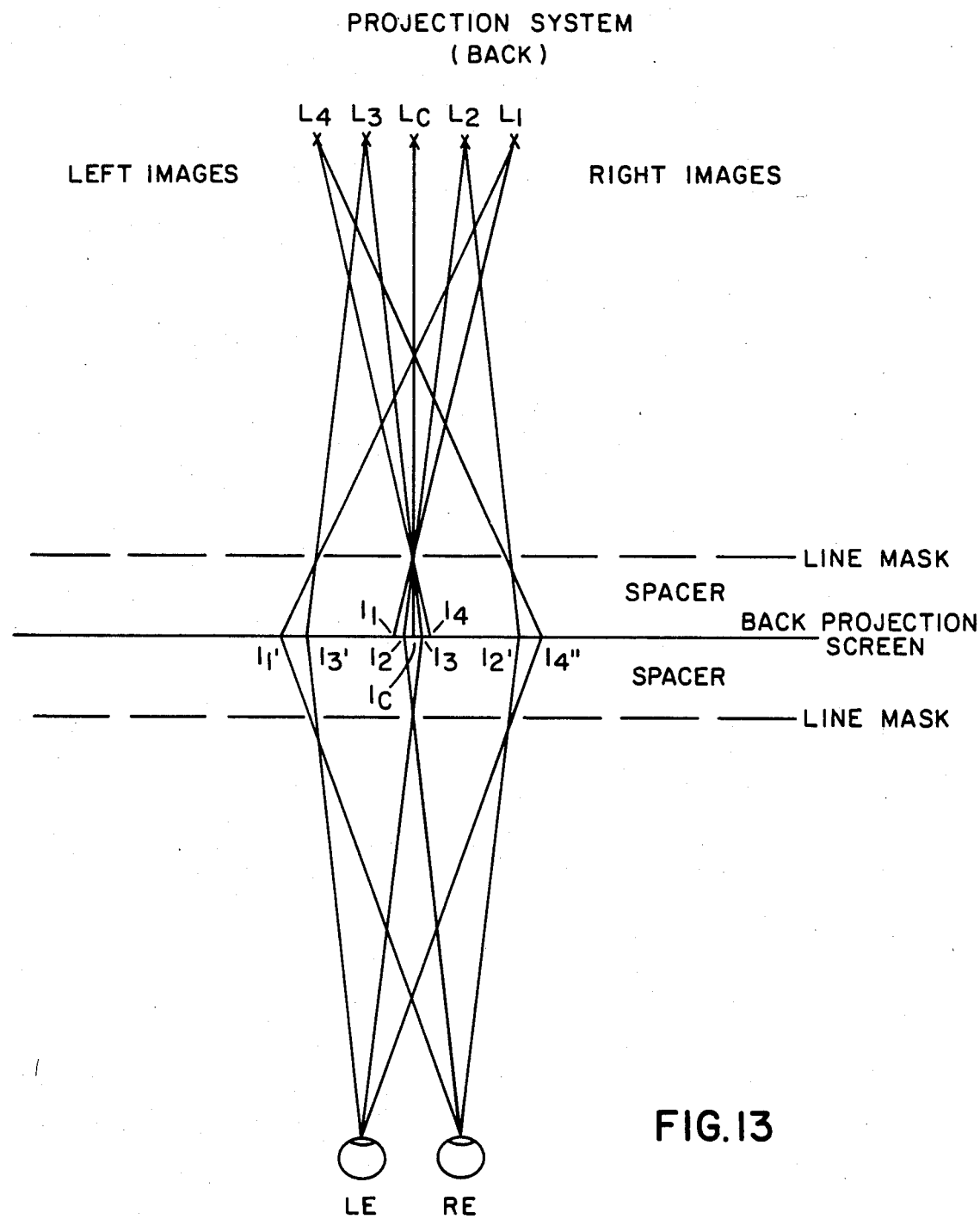
FIG. 13 is a diagrammatic illustration depicting a projection system incorporating the present invention.

FIG. 13 shows a method of projection using the system earlier described. Assuming a set of lenses with parallel optical axes perpendicular to a screen are used, the lenses would then project right and left images which had been shot previously by an indirect method. Those images or projections will in turn provide line forms under the light absorbing mask. The excess of projected light will be absorbed by the mask and will not interfere with the viewing. The viewing will take place by an observer who when viewing through the mask will see the right and left elements of the stereo image. FIG. 13 shows a back projction. It is essentially the same as the front projection system except that in addition to the projectors with their parallel optical axes perpendicular to the screen, the back of the screen has an identical line mask to the front with an identical spacer between them and aligned together. The line forms created by the back projection will be viewed by an individual observer on the other side. The observer can move his eyes to right and to the left and still maintain true stereroscopic viewing, seeing right eyed images with the right eye, and left eyed images with the left eye. This system of back or front projection could be used with either still or motion projection. The observer would have the advantage of being able to be positioned at many locations in front of the projection screen. The distance that the true stereoscopic views would be available would be D2 plus, thereby allowing many rows of seats or standing columns. The angles from center from perpendicular could be many and varied thereby allowing a relative radius of seats extending from the flat screen. During the projection, the observer can move his eyes to the right and left or his head to the right and left and still obtain true stereoscopic vision. FIG. 13 shows that the observer's left eye when looking straight ahead will see image I3 which in fact is a left eyed image. When the eye looks to the right, the left eye will still see image I4 which is a different aspect of the left sided image. The right eye when looking straight ahead will see image I2 which is an aspect of the right image. The right eye then looking to the left will see image I1 which in fact is a different aspect of the right images. The left eye in the left looking position will see image I3 which is another aspect of the left images. In the right looking position, the left eye will see I4, a left aspect; the right eye will see I2, a right aspect, thereby assuring many interlocking areas of bundles of three-dimensional stereoscopic information.

Figure 14:
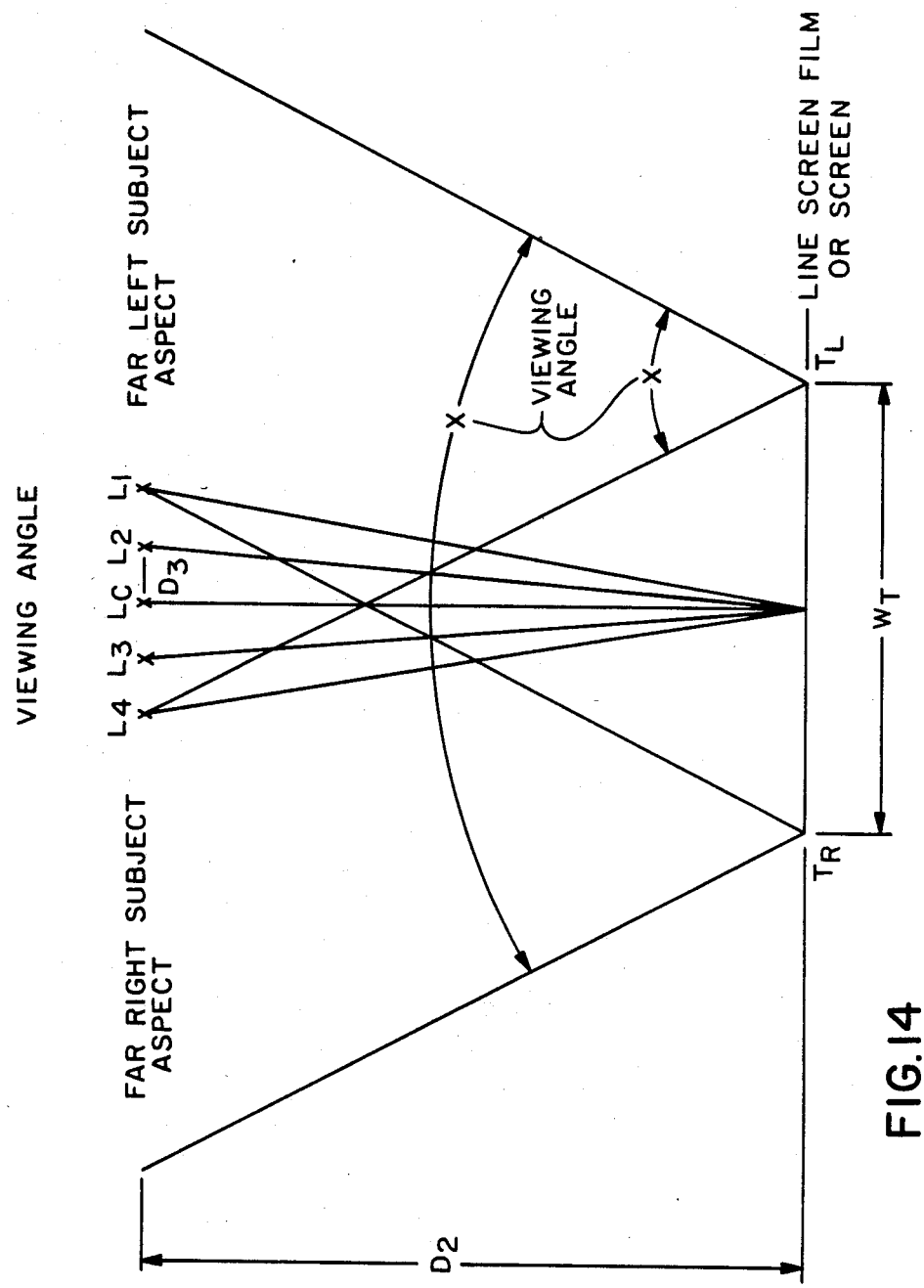
FIG. 14 is a diagrammatic illustration relating to maximum viewing angles of the assembly of the present invention.

FIG. 14 shows a method of determining a maximum angle of view that will contain full true stereoscopic information from a given transparency and given lens movement positions. The transparency width is indicated by WT. If a line is drawn from L4 which is the most extreme right subject aspect position but yet left lens movement position, to the far left of the transparency point TL, the angle of that line then compared with the perpendicular will equal the viewing angle. Conversely, on the other side a line drawn from L1, the far left aspect of the subject but far right lens movement, to TR, the right side of the transparency, will complete the formation of the true stereoscopic viewing angles.

Figure 15:
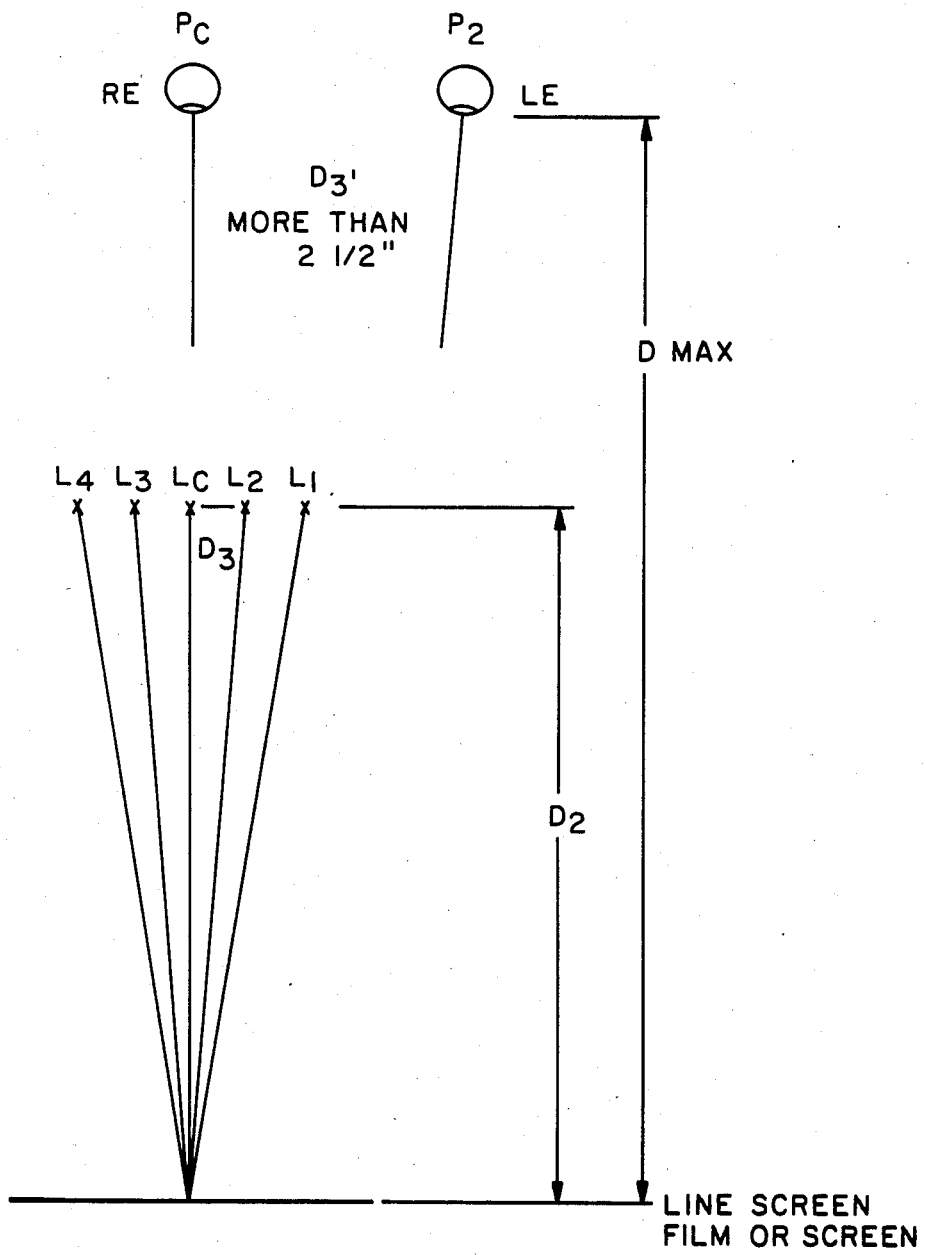
FIGS. 15 and 16 are diagrammatic illustrations relating to minimum and maximum viewing distances of the assembly of the present invention.

FIG. 15 deals with viewing distance. In order to calculate the maximum true stereoscopic viewing distance D3, is divided into $2\frac{1}{2}$ inches. That number will be multiplied times D2. The product of that will be D maximum at that distance D3' will not be more than $2\frac{1}{2}$ inches and will not exceed one ocular pairing still allowing stereoscopic viewing.

Figure 16:
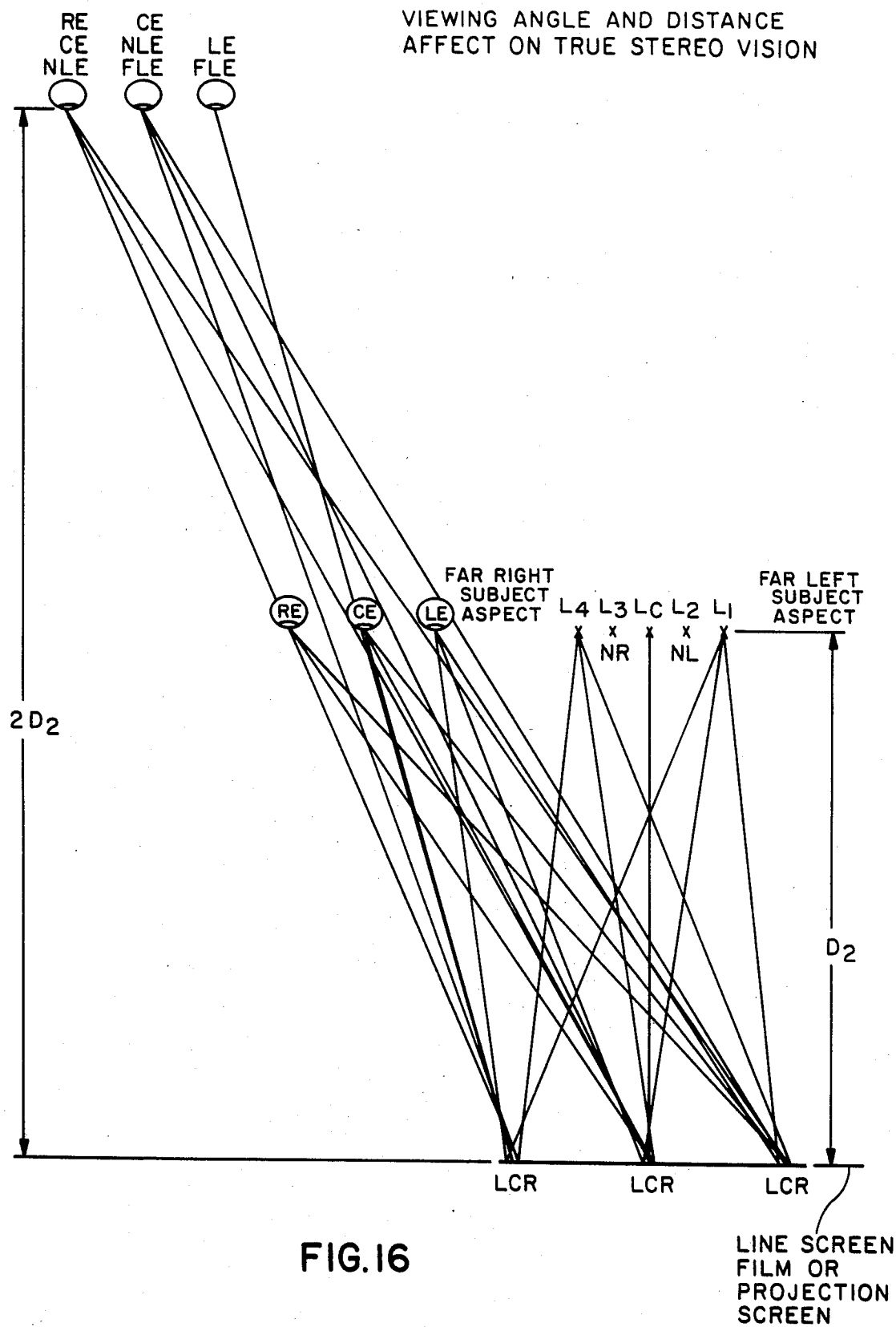

FIG. 16 shows a plan view of angle and distance effect on true stereo vision. The lens position for far left subject aspect in L1 near left is L2, lens center position near right is L3, far right is L4. These then in turn are shown to produce images on a photosensitive material through a line screen mask. The viewer or observer is to be in a far right angle position. The observer's right and left eyes are indicated in a position equal to D2. The right eye and left eye of the observer will see right and center images of the subject right aspect and center aspect images of the subject, but the observer will view those images through openings in the line screen mask that are not the same openings through which the subject was initially formed. This feature, which is not present with optically active line screens and lenticular screens, allows the great angle of viewing. The eyes of the observer are further placed in a position twice D2, again at the extreme right viewing angle. The right eye will again be able to view right eyed images, and the left eye will either view center images or left images. Again the observer will be viewing the images on the transparency through openings in the line screen mask that are either to the right or left of the openings that allowed the light to pass from the lenses in order to form the images on the photosensitive material to begin with. Thus FIG. 16 shows how the transparency or projection screen radiates bundles of true stereoscopic information at many varied angles from the perpendicular within the ideal viewing angle. Also this figure shows how those bundles of stereoscopic information produce correct right-left eye relationships at varied distances within that viewing angle and within the prescribed viewing distance. It should be noted that at times the right and left eye will see left and right images, but the left eye will see a far left image aspect and the right eye will see a near left image aspect thereby allowing the eyes to again view in a stereoscopic manner. The converse will be true at times, the right eye will view far right eyed aspect where the left eye will view a near right eyed aspect. Again these will produce a true stereoscopic vision. From these points it can be seen that by generating a greater number of subject aspects more stereo pairings will be provided. That is, five aspects will produce more stereo pairings than three aspects and seven more than five, and eleven more than seven and so on. Those pairings as well as their intersections increase in a geometric manner. When more images are placed in the bundles (for example, providing five right hand images ranging from far right to very near right, to center, and then out from very near left through a series of five left exposures to far left), the exposures provide a series of intersecting right and left eye stereoscopic information. This is true even though at times the observer may be viewing far right with the right eye and very near to far right with the left eye. A properly spaced ocular pair is still maintained.

As a method of producing a three-dimensional effect transparency, the method of the present invention includes several steps:

(A) Spaced object locations are identified along an object path which extends transversely of the central axis of the camera.

(B) The object, the image of which is to be recorded, is placed at one of the object locations.

(C) The lens is placed at a lens location along the lens path corresponding to the object location.

(D) The lens is opened to expose strips of the material.

(F) The steps of placing, disposing and opening are repeated until the object has been photographed at all of the object locations.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. Three-dimensional display apparatus comprising the combination of a cathode ray tube having a viewing face and adapted to scan vertically and provide regularly spaced right image scans and regularly spaced left image scans in an alternating sequence, and a line screen assembly positioned in a predetermined relationship with said viewing face, said line screen assembly comprising:

a first line screen disposed against said face and comprising a plurality of vertical blocking portions spaced by vertical transparent portions with a blocking portion being disposed between each adjacent right image scan and left image scan; and a second line screen disposed substantially parallel to and spaced from said first line screen, said second line screen also comprising a plurality of vertical blocking portions spaced by vertical transparent portions, the blocking portions of said second line screen being in alignment with the transparent portions of said first line screen, each blocking portion of said second line screen having a width at least slightly greater than the width of the underlying corresponding transparent portion of said first line screen.

2. Three-dimensional display apparatus comprising:

a single substantially vertically disposed projection screen;

a plurality of projection lenses which are horizontally spaced and which have optical axes substantially perpendicular to said screen;

a film associated with each lens depicting the image of the object to be viewed in a position corresponding to the position of its associated lens;

a light source associated with each lens for projecting the image on each film through its corresponding lens; and a line screen mask extending parallel to and spaced from said screen toward said lenses, said mask comprising a plurality of blocking portions spaced by transparent portions, all of said portions extending substantially vertically, said projection screen having projected thereon a plurality of image segments extending parallel to said transparent portions, said screen being completely filled with said image segments with overlapping of adjacent image segments.

3. Display apparatus as set forth in claim 2 wherein said projection screen is a reflective front projection screen and wherein said blocking portions of said mask include light absorbing material.

4. Display apparatus as set forth in claim 2 wherein said screen is a back projection screen.

5. Display apparatus as set forth in claim 4 wherein said apparatus further includes a second line screen mask extending parallel to and spaced from said screen and on the side of said screen away from said lenses, said second screen comprising a plurality of vertical blocking portions spaced by vertical transparent portions.

6. Display apparatus as set forth in claim 5 wherein said first and second line screen masks are substantially identical, are in alignment and are substantially equally spaced from said screen.

* * * * *

UNITED STATES PATENT AND TRADEMARK OFFICE
CERTIFICATE OF CORRECTION

PATENT NO. : 4,671,632

DATED : June 9, 1987

INVENTOR(S) : Jerome M. August

It is certified that error appears in the above-identified patent and that said Letters Patent is hereby corrected as shown below:

Col. 1, Line 63, after "lenticular" insert --screens,--.
Col. 2, Line 17, change "fo" to --of--.
Col. 2, Line 26, change "angle" to --range--.
Col. 3, Line 16, after "FIG. 3" insert --is a front--.
Col. 3, Line 38, change "." to --;--.
Col. 5, Line 66, change "2"" (second occurrence) to --42"--.
Col. 7, Line 5, delete boldface of "85".

Col. 9, Line 39, delete boldface of "360°".
Col. 10, Line 20, after "optical" delete "20".
Col. 10, Line 21, after "by" delete "the".
Col. 11, Line 42, change "two dimensional" to --two-dimensional--.
Col. 12, Line 25, after "D5," insert a space.
Col. 13, Line 18, change "ohanges" to --changes--.
Col. 15, Line 10, after "pairing" insert --,--.
Col. 15, Line 14, change "in" to --is--.
Col. 3, Line 8, change "inventon" to --invention--.
Col. 8, Line 63, change "streoscopic" to --stereoscopic--.
Col. 11, Line 27, after "used" insert --and--.
Col. 12, Line 59, change "insections" to --intersections--.
Col. 13, Line 61, after "thickness" insert --of--.

UNITED STATES PATENT AND TRADEMARK OFFICE
CERTIFICATE OF CORRECTION

PATENT NO. : 4,671,632

DATED : June 9, 1987

INVENTOR(S) : Jerome M. August

It is certified that error appears in the above-identified patent and that said Letters Patent is hereby corrected as shown below:

Col. 14, line 22, change " projction" to --projection--.
Col. 14, line 31, change "stereroscopic" to --stereoscopic--.

Signed and Sealed this

Fifth Day of April, 1988

Attest:

DONALD J. QUIGG

*Attesting Officer*   *Commissioner of Patents and Trademarks*